(12) United States Patent
Brenner

(10) Patent No.: US 6,760,663 B2
(45) Date of Patent: *Jul. 6, 2004

(54) SOLUTION SEPARATION METHOD AND APPARATUS FOR GROUND-AUGMENTED GLOBAL POSITIONING SYSTEM

(75) Inventor: Mats A. Brenner, Plymouth, MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,193

(22) Filed: Sep. 14, 1999

(65) Prior Publication Data

US 2001/0020214 A1 Sep. 6, 2001

(51) Int. Cl.$^7$ ............................ G01C 21/00; G06G 7/78; H04B 7/185

(52) U.S. Cl. ........................ 701/213; 701/214; 701/215; 342/357.02; 342/357.03; 342/357.06; 342/357.12

(58) Field of Search ................................. 701/213, 214, 701/215, 216, 217, 220, 221, 224; 342/357.02, 357.03, 357.04, 357.06, 357.09, 357.12, 357.14

(56) References Cited

U.S. PATENT DOCUMENTS

| 5,600,329 | A | * | 2/1997 | Brenner ...................... 342/357 |
| 5,760,737 | A | * | 6/1998 | Brenner ...................... 342/357 |
| 5,786,773 | A | | 7/1998 | Murphy |
| 5,884,220 | A | | 3/1999 | Farmer et al. |

OTHER PUBLICATIONS

"GPS WAAS LAAS The Global Positioning System (GPS)", *Innovative Solutions International*, http://www.i-sicns.com/GPSWSLS.HTM, 4 p., (1998).
"ISI's WAAS/LAAS Development Services Implementation Solutions That Work", http://www.isicns.com/WLDEV.HTM, 2 p., (1998).

(List continued on next page.)

*Primary Examiner*—William A Cuchlinski, Jr.
*Assistant Examiner*—Brian J. Broadhead
(74) *Attorney, Agent, or Firm*—McDonnell Boehnen Hulbert & Berghoff

(57) ABSTRACT

Global positioning systems (GPSs) estimate positions of vehicles based on signals from earth-orbiting satellite transmitters. For accuracy and reliability reasons, these systems have traditionally not be used for critical phases of aircraft navigation and guidance, such as aircraft landings. However, recent years have seen the development of ground-augmented GPS systems for use in automatic landing systems. These augmented systems rely on broadcast correction data to correct positions estimates, or solutions, and thus provide more accurate position solutions. Unfortunately, the conventional methods of measuring accuracy in these augmented systems cannot adequately cope with loss of correction data or satellite signals and thus lead to more aborted landings than acceptable. Accordingly, the inventor devised a ground-augmented GPS system that incorporates a better method for determining the accuracy of its position solution. One exemplary embodiment determines a main position solution and one or more position subsolutions, with the main solution using all broadcast correction data and each subsolution using a respective subset of the correction data. Differences or separations between the main position solution and the subsolution are then used to determine accuracy, or protection, limits for the main position solution. Another embodiment uses Kalman filters to incorporate vehicle motion data into the calculation of the main solution and the subsolutions, enabling the determination of protection limits during periods lost GPS or correction data.

16 Claims, 4 Drawing Sheets

OTHER PUBLICATIONS

Lawrence, D., et al., "Performance Evaluation of On–Airport Local Area Augmentation System Architectures", http://einstein.stanford.edu/gps/ABS/laas_perf$_{13}$ eval_dg196.html, Presented at ION GPS–96, Kansas City, Missouri, 8 p., (Sep. 17–20, 1996).

Loh, R., et al., "Requirements for Integration of Satellite–Based Augmentation Systems", *Abstract, Innovative Solutions International, Technical Papers*, http://www.isicns.com/SBAS.HTM, 1 p., (1998).

Pervan, B.S., et al., "Development, Implementation, and Testing of a Prototype LAAS Architecture", Stanford University GPS Lab at http://einstein.stanford.edu/gps/ABS/prototype$_{13}$laas_bsp97.html, 11 p., (1997).

Johnston, G. T., "Results And Performance Of Multi–Site Reference Station Differential GPS", in the International Journal Of Satellite Communications, John Wiley and Sons, US, vol. 12, No. 5, Sep. 1994 pp. 475–488, XP000978124, ISSN: 0737–2884, p. 475–p. 479.

* cited by examiner

SOLUTION SEPARATION METHOD AND APPARATUS FOR GROUND-AUGMENTED GLOBAL POSITIONING SYSTEM

TECHNICAL FIELD

The present invention concerns the problem of improving reliability of radio navigation and guidance systems, particularly ground-augmented or differential global positioning systems.

BACKGROUND OF THE INVENTION

A global positioning system (GPS) measures the three-dimensional, global position of a radio receiver, using the distances between the radio receiver and a number of earth-orbiting satellite transmitters. The receiver, usually mounted to a vehicle such as a commercial passenger aircraft, receives signals from the satellite transmitters. Each signal indicates both the position of its transmitter and its transmission time, enabling the receiver, equipped with its own clock, to approximate signal transit times and to estimate the distances to the transmitters. A processor coupled to the receiver uses at least four of these distances, known as pseudoranges, to approximate or estimate the position of the receiver and the associated vehicle. The accuracy of these estimates, or position solutions, depends on a number of factors, for example, changing atmospheric conditions and performance of individual satellite transmitters.

In commercial aircraft navigation and guidance, global positioning systems (GPSs) have traditionally been used only for determining position of an aircraft during non-critical portions of a flight, that is, between takeoff and landing. However, in recent years, researchers have started extending GPSs for use during landings.

These extended systems have taken the form of ground-augmented or differential global positioning systems which typically include two to four ground-based GPS receivers and a ground-based differential correction processor (DCP) and a correction-data transmitter, all located around an aircraft landing area. (These systems are sometimes called GPS-based Local-Area-Augmentation Systems, or GPS-based LAASs.) The ground-based GPS receivers, each with a known position, work as normal GPS receivers in determining respective sets of pseudoranges based on signals from at least four earth-orbiting satellite transmitters. These pseudoranges are fed to the ground-based DCP, which uses them and the known positions of the ground receivers to determine correction data. The correction-data transmitter then transmits to aircraft approaching the landing area. These approaching aircraft use the correction data to correct position estimates of on-board GPS receivers, providing better position solutions than possible using their on-board GPS receivers alone.

These corrected position solutions are then compared to a reference landing path to determine course deviations necessary to ensure the aircraft follows the reference landing path. The course deviations are input to an autopilot system which guides the aircraft during automatic landings. For the autopilot system to function within safety limits set by the Federal Aviation Administration, the position estimates are required to stay within minimum accuracy limits known as vertical and horizontal alert limits. Failure to stay within accuracy limits causes issuance of an alert, signaling a pilot to abort the automatic landing and to restart the landing process.

Unfortunately, conventional methods of determining the accuracy of the corrected position estimates lack the ability to cope with loss of satellite signal receptions or correction data stemming from ionospheric effects, unintentional jamming, satellite failures, or fading of correction-data transmissions. As a result, systems using these methods are prone to more aborted landing attempts than acceptable.

Accordingly, there is a need for better ways of determining accuracy in ground-augmented or differential global positioning systems.

SUMMARY OF THE INVENTION

To address this and other needs, the inventor devised a ground-augmented (or differential) navigation and guidance system that incorporates a unique method for determining the accuracy of its position solution. In a first exemplary embodiment, the system includes a receiver for receiving signals from several satellite transmitters and a processor for determining a main position solution and one or more position subsolutions. The main position solution incorporates a set of pseudoranges corrected using all available correction data from a ground transmitter, and each subsolution based on a subset of the available correction data. Differences or separations between the main position solution and the subsolution are then used to determine accuracy or protection limits for the main position solution.

In a second exemplary embodiment, the navigation system further includes inertial sensors, for example, accelerometers and gyroscopes, for providing vehicle motion data to the processor. The processor uses Kalman filters to determine the main position solution, subsolutions, protection limits, and course deviations from the motion data as well as past and present values of the satellite and/or correction-data signals.

Adding motion data further improves reliability, because the processor can compute protection limits during brief periods when there is insufficient data for computing the position solution. In a sense, the Kalman filters and the motion data enable the processor to build up "momentum" for coasting through periods of lost GPS or differential correction information.

DETAILED DESCRIPTION OF THE PREFERRED EMBODIMENTS

The following detailed description, which references and incorporates FIGS. 1–4, describes and illustrates specific embodiments of the invention. These embodiments, offered not to limit but only to exemplify and teach the concepts of the invention, are shown and described in sufficient detail to enable those skilled in the art to implement or practice the invention. Thus, where appropriate to avoid obscuring the invention, the description may omit certain information known to those of skill in the art.

As used herein, the term "pseudorange" includes smoothed pseudoranges and carrier-propagated pseudoranges. Also, the term "pseudorange corrections" includes corrections to smoothed pseudoranges and corrections to carrier-propagated pseudoranges. Carrier-propagated pseudoranges are pseudoranges that are updated using only carrier measurments, not code measurments. The exemplary embodiments use smoothed pseudoranges; however, other embodiments substitute carrier propagated pseudoranges using differential carrier corrections.

First Exemplary Embodiment

Figure 1:
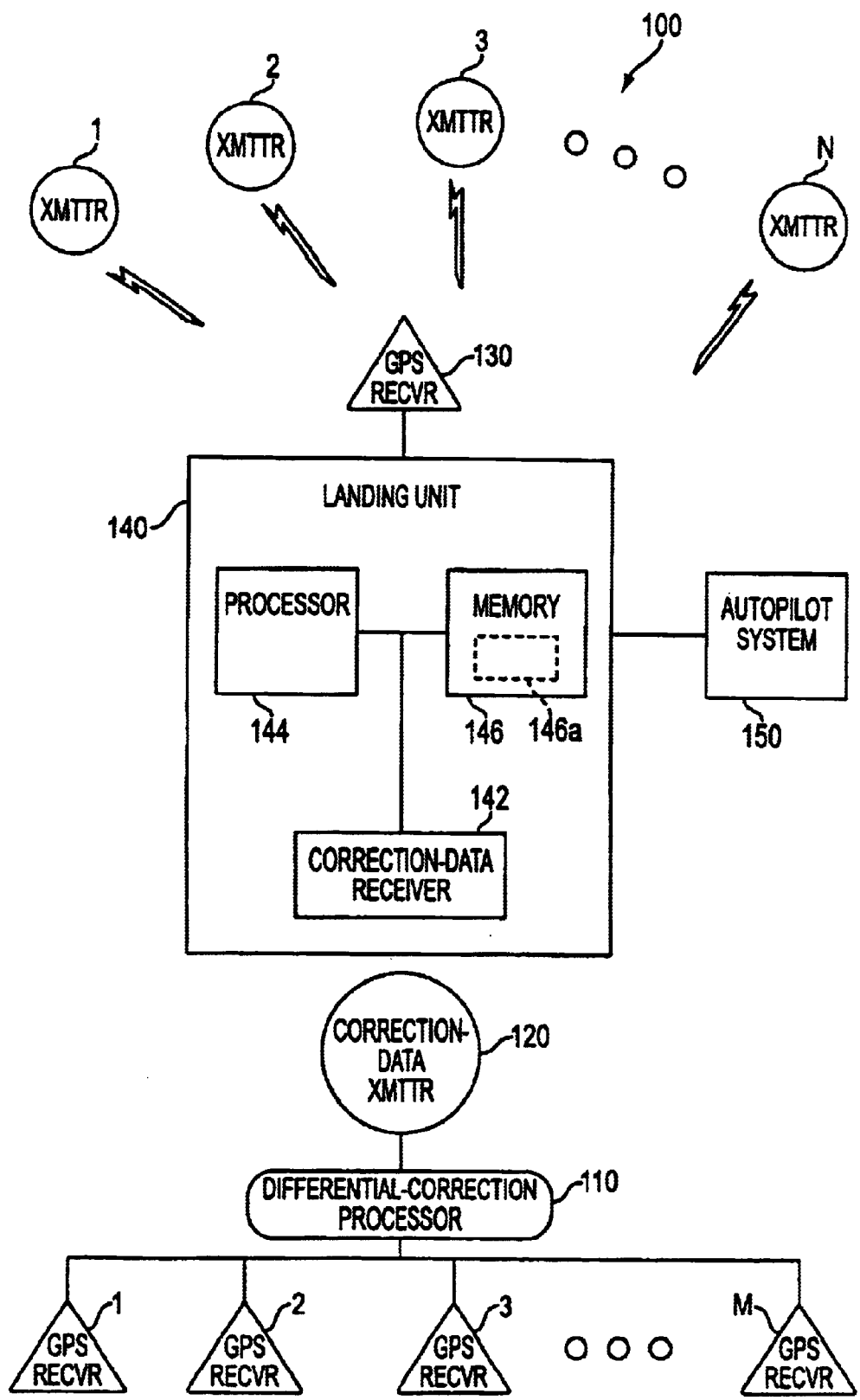
FIG. 1 is a block diagram of a first exemplary navigation and guidance system 100 incorporating the present invention.

FIG. 1 shows a differential radio navigation system 100 incorporating teachings of the present invention. The system includes several moving transmitters 1-N, several GPS ground receivers 1-M, a differential-correction processor (DCP) 110, a ground-correction transmitter 120, a GPS vehicle receiver 130, a landing unit 140, and an autopilot system 150. Vehicle receiver 130, landing unit 140, and autopilot system 150 are mounted to an aircraft or other vehicle (not shown.)

Transmitters 1-N, in the exemplary embodiment, are a subset of the NAVSTAR GPS constellation of satellite transmitters, with each transmitter visible from respective antennas of ground receivers 1-M and vehicle receiver 130. Transmitters 1-N broadcast N respective signals indicating respective transmitter positions and signal transmission times to ground (or local-area) receivers 1-M and to vehicle receiver 130, which use the signals to determine respective pseudoranges for the ground receivers and the vehicle receiver.

Although the satellites transmit their positions in World Geodetic System of 1984 (WGS-84) coordinates, a Cartesian earth-centered earth-fixed system, the exemplary embodiment determines the position solutions in a local reference frame RLV, which is level with the north-east coordinate plane and tangential to the Earth. This frame choice has a first direction (R) parallel to a given landing runway, a second direction (L) lateral, or cross-track, to the first direction, and a third direction (V) vertical relative to first and second directions. However, frame choice is not critical, since it is well-understood how to transform coordinates from one frame to another.

Differential correction processor 110 receives the pseudoranges from the GPS ground receivers and determines correction data, which correction-data transmitter 130 transmits to a correction-data receiver 142, within landing unit 140. Landing unit 140 also includes a processor 144 and a memory 146. Memory 146 stores one or more software modules 146*a* which govern operation of processor 144 in accord with the present invention. (The invention is not limited to any form, type, or number of receivers, transmitters, processors, or memory.)

Processor 144 uses the correction data from transmitter 120 and the pseudoranges from vehicle receiver 130 to determine a main position solution and one or more position subsolutions. The main position solution is differentially corrected using all the correction data, and the position subsolutions are differentially corrected based on subsets of the correction data. Processor 144 uses the main solution and the subsolutions to compute vertical and lateral (or horizontal) protection limits, which it compares to vertical and lateral alert limits. The exemplary embodiment uses alert limits for a particular weather minimum, such as Category I, II, or III as defined by the Federal Aviation Administration. (For more details on these limits, see RTCA publication D0-245, which is incorporated herein by reference.) If either protection limit falls outside its respective alert limit, the processor signals an integrity failure to the cockpit of the aircraft.

Additionally, the processor uses the main position solution to calculate and output angular and/or linear course deviations or corrections relative a reference path to autopilot system 150. System 150 in turn generates signals for actuators (not shown), to correct the flight path of the aircraft.

Figure 2:
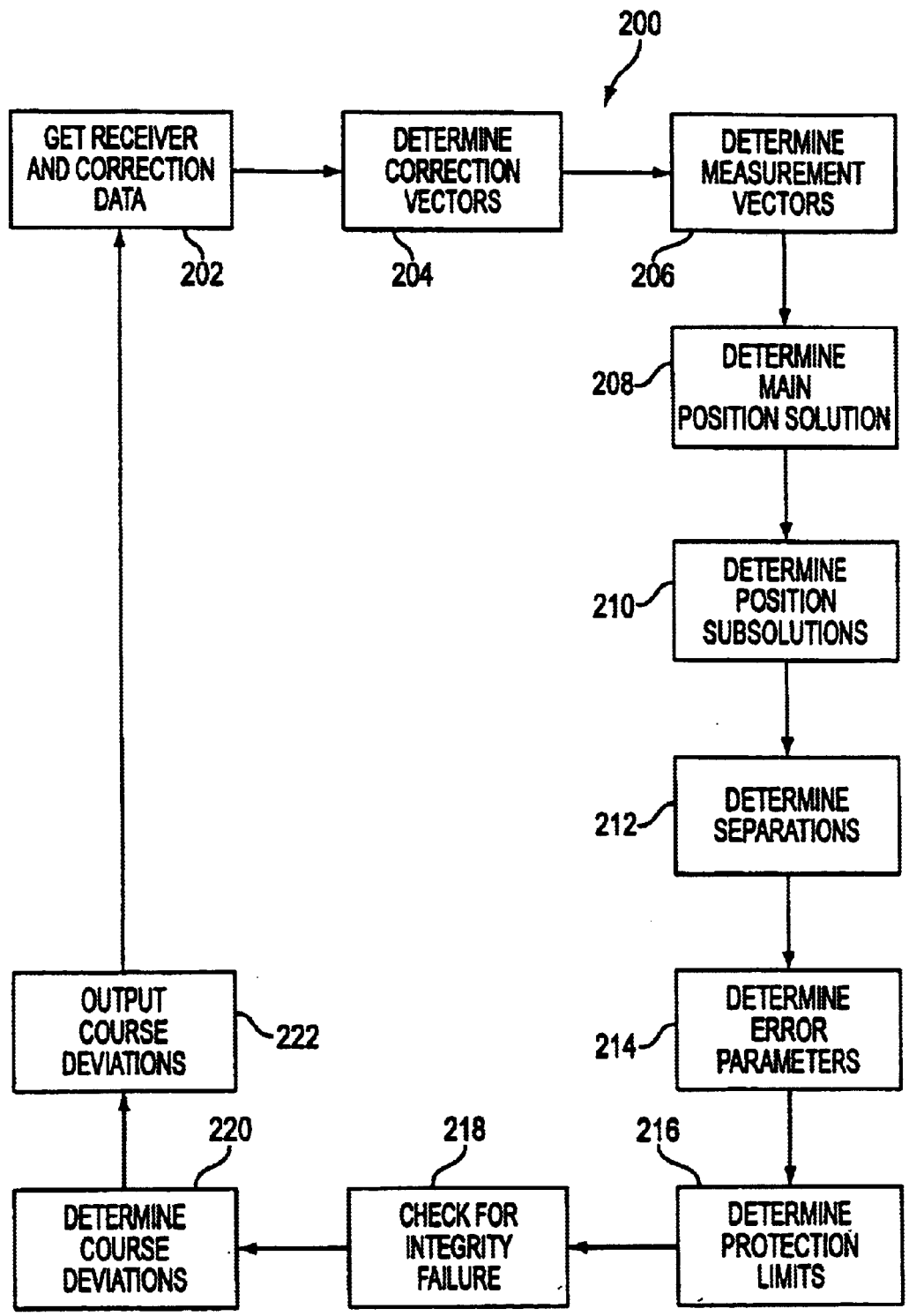
FIG. 2 is a flow chart illustrating a first exemplary method of operating the system of FIG. 1 according to the present invention.

More particularly, FIG. 2 shows an exemplary flow chart 200, illustrating operation of system 100 and especially processor 144 in accord with software modules or computer programs 146*a*. Flow chart 200 includes blocks 202–222, which are executed serially or in parallel in the exemplary embodiment. Some embodiments organize the exemplary process using a greater or lesser number of blocks. Other embodiments implement the blocks as two or more specific interconnected hardware modules with related control and data signals communicated between and through the modules. Thus, the exemplary process flow is applicable to software, firmware, and hardware implementations. In most, if not all instances, the process sequence can be varied from the order shown and described.

At block 202, exemplary operation begins with processor 144 obtaining a set of N pseudoranges from GPS vehicle receiver 130 and correction data from correction-data receiver 142. The correction data can take any form that facilitates or enables the processor to correct or adjust one or more of the N pseudoranges. For example, in one embodiment, this data includes (N×M) pseudoranges and the known positions of the M ground receivers, allowing processor 144 to compute its own differential corrections for the N pseudoranges of the vehicle receiver.

In the exemplary embodiment, correction-data transmitter 120 transmits correction data, twice per second, for each of the N satellite transmitters, with each set of correction data taking the form shown in the following table:

| Data Content | Bits | Range | Resolution |
| --- | --- | --- | --- |
| Ranging Source | 8 | 1–255 | 1 |
| Issue of Data | 8 | 0–255 | 1 |
| Pseudorange Correction | 16 | +/−327.67 m | 0.01 m |
| Correction Rate | 16 | +/−32.767 m/s | 0.001 m/s |
| $\sigma_{pr\_gnd}$ | 8 | 0–5.08 m | 0.02 m |
| $B_1$ | 8 | +/−6.35 m | 0.05 m |
| $B_2$ | 8 | +/−6.35 m | 0.05 m |
| . | . | . | . |
| . | . | . | . |
| . | . | . | . |
| $B_M$ | 8 | +/−6.35 m | 0.05 m |

Of specific interest to the exemplary embodiment are the psuedorange correction, the B values ($B_1$–$B_M$), and $\sigma_{pr\_gnd}$. The psuedorange correction of the n-th satellite transmitter is defined as the average of the differential psuedorange corrections for the M ground receivers, or mathematically as $$\delta\rho_n = \frac{1}{M}\sum_{1}^{M} \delta\rho_{n,m} \tag{1}$$

where $\delta\rho_n$ denotes the differential correction for the n-th satellite transmitter, M denotes the number of ground receivers, and $\delta\rho_{n,m}$ denotes the differential pseudorange correction for the n-th satellite transmitter at the m-th ground receiver. The B values for the n-th satellite transmitter are defined as $$B_{n,k} = \delta\rho_n - \frac{1}{M-1}\sum_{m \neq k}^{M} \delta\rho_{n,m} \qquad (2)$$

where $B_{n,\,k}$ denotes the k-th B value for the n-satellite; the summation is over all M except for m=k; and k ranges from 1 to M. $\sigma_{pr\_gnd}$ denotes the Gaussian distribution that overbounds the error in the broadcast correction and depends on the elevation of the satellite, observed signal-to-noise ratio (S/N$_0$), and convergence status.

In block 204, the processor defines M+1 different N-element correction vectors $\delta\rho^0$–$\delta\rho^M$, based on the full set of N differential corrections for each ground receiver M. The full set of N differential corrections are derived from the M different B values for each of the N satellites. $\delta\rho^0$, the main correction vector, is defined as $$\delta\rho^0 = [\delta\rho_1, \delta\rho_2, \ldots, \delta\rho_N]^T \qquad (3)$$

where each element $\delta\rho_n$ denotes a uniform or nonuniform weighted average of the differential corrections from all the ground receivers 1 to M for the n-th satellite transmitter. $\delta\rho^m$ (for m=1 to M) is defined as $$\delta\rho^m = [\delta\rho_{1,\,m}, \delta\rho_{2,\,m}, \ldots, \delta\rho_{N,\,m}]^T \qquad (4)$$

where element $\delta\rho_{n,\,m}$ is defined as a uniform or non-uniform weighted average of all but the m-th differential correction for the n-th satellite. Thus, each element $\delta\rho_{n,\,m}$ excludes correction information from the m-th ground receiver. Mathematically, this is expressed as $$\delta\rho_{n,k} = \frac{1}{M-1}\sum_{m \neq k}^{M} c_k \delta\rho_{n,m} \qquad (5)$$

where n denotes the n-th satellite and ranges from 1 to N; k ranges from 1 to M; and $c_k$ denotes a respective weight, which in the exemplary embodiment is unity.

Block 206 entails forming an N-element measurement vector $\rho_{meas}$ of pseudoranges from vehicle receiver 130 and "linearizes" it around an initial estimate of the position solution and an initial receiver clock offset estimate. The linearized measurement vector, denoted $\Delta\rho_{meas}$, is defined according to $$\Delta\rho_{meas} = \rho_{meas} - \rho_{est} \qquad (6)$$

where $\rho_{est}$ is an N-element vector of the estimated pseudoranges derived from the initial position estimate and the initial clock offset estimate. After linearizing the vehicle pseudoranges around the initial estimate to determine $\Delta\rho_{meas}$, the processor applies the correction vectors $\delta\rho^0$–$\delta\rho^M$ to determine a set of M+1 N-element corrected measurement (or pseudorange) vectors $\Delta\rho^0_{meas}$–$\Delta\rho^M_{meas}$. More precisely, $\Delta\rho^0_{meas}$, the main corrected measurement vector including correction information from all M ground receivers, is defined as $$\Delta\rho^0_{meas} = \Delta\rho_{meas} + \delta\rho^0 \qquad (7)$$

and $\Delta\rho^m_{meas}$ is defined as $$\Delta\rho^m_{meas} = \Delta\rho_{meas} + \delta\rho^m \qquad (8)$$

where N-element correction vectors $\delta\rho^0$ and $\delta\rho^m$ follow the definitions of Eqns 3, 4, and 5.

In block 208, the processor determines a main position solution $\Delta r_0$, using the main corrected measurement vector $\Delta\rho^0_{meas}$. The processor may use any technique for solving a system of overdetermined algebraic equations, for example, weighted or non-weighted least-squares estimation. "Overdetermined" refers to the presence of redundant pseudoranges. The solution $\Delta r_0$, defined as the main position solution because it incorporates the correction information from all M ground receivers, is defined as $$\Delta r_0 = S_0 \Delta\rho^0_{meas} \qquad (9)$$

where $S_0$ is a 4×N weighted or non-weighted least-squares solution matrix.

Block 210 entails calculating several corrected subsolutions $\Delta r_1, \Delta r_2, \ldots \Delta r_M$, each based on a respective subset of the M differential corrections. In the exemplary embodiment, each subset includes only M−1 differential corrections, with the m-th subset excluding the correction data based on the m-th ground receiver. Thus, the m-th subsolution includes an average correction based on all but the m-th differential correction. The preference for excluding one ground reference receiver stems from the low likelihood that more than one of these receivers will ever fail or otherwise present an abnormal correction circumstance to the landing unit. However, if desirable, other embodiments can exclude corrections from more than one ground receiver. Similar to the main solution $\Delta r_0$, the m-th subsolution $\Delta r_m$ is defined as $$\Delta r_m = S_m \Delta\rho^m_{meas} \qquad (10)$$

where $S_m$ is a weighted or non-weighted 4×N least-square subsolution matrix.

In the exemplary embodiment, the main solution $\Delta r_0$ and the subsolutions $\Delta r_1$–$\Delta r_M$ are four-element vector quantities with three elements representing respective runway, lateral, and vertical coordinates and a fourth element c$\Delta$t representing the distance related to the receiver clock offset, where c is the speed of light, and $\Delta$t is the receiver clock offset. The center of the runway-lateral-vertical (RLV) frame is the initial position estimate. (However, other initial position estimates can also be chosen.) Thus, the three RLV coordinates actually represent a position relative the initial position estimate because of the linearization of the governing equations around the initial estimate. Hence, to obtain an absolute position solution, the RLV coordinates must be added to the corresponding coordinates of the initial position estimate. However, as used herein, position solution broadly connotes any relative position or absolute position solution.

In block 212, the processor computes lateral separations $b_{L1}$–$b_{LM}$ and vertical separations $b_{V1}$–$b_{VM}$ based on respective mathematical distances between the main position solution $\Delta r_0$ and the respective subsolutions $\Delta r_1$–$\Delta r_M$. The exemplary embodiment defines separations $b_{L1}$–$b_{LM}$ as the respective lateral distance between the main solution $\Delta r_0$ and respective subsolutions $\Delta r_1$–$\Delta r_M$. In the lateral direction relative the aircraft glide path, the distance $b_{Lm}$ between subsolution $\Delta r_m$ and main solution $\Delta r_0$ is $$b_{Lm} = \sqrt{(\Delta r_0(L) - \Delta r_m(L))^2} \qquad (11)$$

where (L) denotes lateral components of the position solutions. Similarly, the exemplary embodiment defines the vertical separations $b_{V1}$–$b_{VM}$ as the actual vertical distances between the main solution $\Delta r_0$ and respective subsolutions $\Delta r_1$–$\Delta r_M$. In the vertical plane relative the aircraft glide path, the distance $b_{Vm}$ between subsolution $\Delta r_m$ and main solution $\Delta r_0$ is $$b_{Vm} = \sqrt{(\Delta r_0(V) - \Delta r_m(V))^2} \quad (12)$$

where the V denotes the vertical component of the main solution and the m-th subsolution. Operation then proceeds to block 214.

Block 214 entails determining lateral and vertical error parameters, $A_{L1}$–$A_{LM}$ $A_{V1}$–$A_{VM}$, based on the noise-induced errors in respective subsolutions $\Delta r_1$–$\Delta r_M$. The noise-induced errors force each subsolution away from the actual position of vehicle receiver 130.

In determining the error parameters, the processor first calculates error covariance matrices $P_1$–$P_M$ describing the statistics of the noise-induced errors for corresponding subsolutions $\Delta r_1$–$\Delta r_M$. The m-th error covariance matrix $P_m$ is defined as $$P_m = E[\delta r_m \delta r_m^T] \quad (13)$$

where $\delta r_m$ represents the effect of noise on the m-th subsolution and is defined as $$\delta r_m = S_m w; \quad (14)$$

where w is the N-dimensional measurement noise vector. $E[ww^T]$ is defined as $$E[ww^T] = \sigma_{pr-air}^2 + \frac{M}{M-1}\sigma_{pr-gnd}^2 \quad (15)$$

where $\sigma^2_{pr\_air}$ depends on the aircraft and $\sigma^2_{pr\_gnd}$ is defined in the correction data from correction-data transmitter 120.

This equation can be rewritten as $$E[ww^T] = \begin{bmatrix} \sigma_{w,1}^2 & 0 & \cdots & 0 \\ 0 & \sigma_{w,2}^2 & \cdots & 0 \\ \vdots & \vdots & \ddots & \vdots \\ 0 & 0 & 0 & \sigma_{w,N}^2 \end{bmatrix}$$

where $$\sigma_{w,n}^2 = \sigma_{pr-air,n} + \frac{M}{M-1}\sigma_{pr-gnd,n}^2$$

and the index n indicates which satellite the measurements are taken from. The element $ww^T$ is the matrix obtained when performing a matrix multiplication of the column vector w with the row vector $w^T$, which is the transpose of w. As one having skill in the relevant field will recognize, $E[X]$ is the expected value of the random variable X. Therefore, if $f(x)$ is the probability density function, $E[X]$ is defined as $$E[X] = \int_{-\infty}^{\infty} x f(x) dx.$$

Similarly, the value $\sigma_{pr-air}$ corresponds to the 1-sigma value of the noise affecting the airborne GPS measurements. As a result, if $f_{air}(x)$ is the probability density function for the airborne noise in a satellite measurement, which is assumed to be a Gaussian distribution, then $$\sigma_{pr-air}^2 = \int_{-\infty}^{\infty} x^2 f_{air}(x) dx.$$

In the exemplary embodiment, processor 144 calculates matrices $P_1$–$P_M$ from $$P_m = S_m E[ww^T] S_m^T \quad (16)$$

The exemplary implementation assumes the errors are zero-mean with Gaussian distribution. Thus, the subsolution errors are confined to corresponding ellipsoidal volumes in the RLV coordinate system. Each point within the region corresponds to a different possible error, with the center corresponding to zero error and the maximum error at either end.

After determining the covariance matrices, the processor determines the variances of the lateral and vertical errors. These variances are available from the diagonals of the covariance matrices $P_1$–$P_M$. The variances define the spreads of the errors around the average errors, and thus control the magnitudes of the maximum lateral and vertical errors between the m-th subsolution $\Delta r_m$ and the actual position. With the variances, the processor computes the lateral and vertical error parameters $A_{L1}$–$A_{LM}$ and $A_{V1}$–$A_{VM}$ using $$A_{Vm} = \sqrt{VAR_{Vm}} Q^{-1}(P_{MD}) \quad (17)$$

$$A_{Lm} = \sqrt{VAR_{Lm}} Q^{-1}(P_{MD}) \quad (18)$$

where $VAR_{Lm}$ and $VAR_{Vm}$ denote the lateral and vertical variances from the m-th covariance matrix; $P_{MD}$ is a given probability of missed detection; and $Q^{-1}$ denotes the inverse of $$Q(x) = \frac{1}{\sqrt{2\pi}} \int_x^{\infty} e^{-\frac{t^2}{2}} dt \quad (19)$$

the well-known normalized cumulative distribution function. Some embodiments use missed-detection probabilites promulgated by the Federal Aviation Adminstration in RTCA publication D0-245.

In block 216, the processor determines a lateral and a vertical protection limit, using one or more of the lateral and vertical solution separations $b_{L1}$–$b_{LM}$ and $b_{V1}$–$b_{VM}$ and one or more of the lateral and vertical subsolution error parameters $A_{L1}$–$A_{LM}$ and $A_{V1}$–$A_{VM}$. In the exemplary embodiment, the process determines the lateral protection limit (LPL) according to $$LPL = \max\{LPL_{H0}, LPL_{H1}\} \quad (20)$$

where max denotes the maximum of the quantities in the brackets; $LPL_{H0}$ is defined as $$LPL_{H0} = \sqrt{VAR_{L0}} \, Q^{-1}\left(\frac{P_{ffMD}}{2}\right) \quad (21)$$

and $LPL_{H1}$ is defined as $$LPL_{H1} = \max\{b_{Lm} + A_{Lm}\} \text{ over } m=1, M \quad (22)$$

$VAR_{L0}$, the lateral variance of the error in the main position solution, is determined from the error covariance matrix for the main position solution. $P_{ffMD}$ is a probability of fault-free missed detection, such as that defined in RTCA publication DO-245. Similarly, the exemplary embodiment determines the vertical protection limit (VPL) according to $$VPL = \max\{VPL_{H0}, VPL_{H1}\} \quad (23)$$

where $VPL_{H0}$ is given by $$VPL_{H0} = \sqrt{VAR_{V0}}\, Q^{-1}\left(\frac{P_{ffMD}}{2}\right) \quad (24)$$

and $VPL_{H1}$ is given by $$VPL_{H1} = \max\{b_{Vm} + A_{Vm}\} \text{ over } m=1, M \quad (25)$$

$VAR_{V0}$, the vertical variance of the error in the main position solution, is determined from the error covariance matrix for the main position solution.

Having determined the lateral and vertical protection limits, processor 144 executes block 218 which entails comparing them to respective predetermined lateral and vertical alarm limits LAL and VAL. If either the lateral protection limit or the vertical protection limits exceeds its alarm limit, the processor signals the aircraft cockpit, alerting the pilot or other predetermined system that the lateral or vertical protection limits is out of bounds. Optionally, if the actual lateral or vertical separations between the m-th solution $\Delta r_m$ and the main position solution $\Delta r_0$ exceeds a threshold based on a selected probability of false detection, the processor sets a failure flag indicating a ground-receiver fault. However, in conventional LAAS, this failure detection is handled by the differential correction processor.

At block 220, after calculating the protection limits, the processor computes angular and/or linear course deviations based on the main position solution and the reference path to autopilot system 150. And, at block 222, the autopilot system automatically corrects or adjusts the glide path of the aircraft.

After executing block 222, the processor returns to block 202 to get new data from the vehicle receiver and new correction data to generate a new position solution, protection limits, and course deviations.

In sum, the first embodiment applies a unique solution-separation technique for determining protection limits of a differentially corrected position solution. Although the first embodiment explicitly operates only on present GPS measurement and correction data, in so-called "snapshot" fashion, its chief advantage is its unique suitability for Kalman filter implementations. Through the use of Kalman filters, the processor incorporates not only present measurement and correction data, but also past measurement and correction data into the integrity monitoring process. Moreover, Kalman filters enable the processor to incorporate inertial sensor data into the calculation of the position solutions and protection limits, as evidenced in the second embodiment.

Second Exemplary Embodiment

Figure 3:
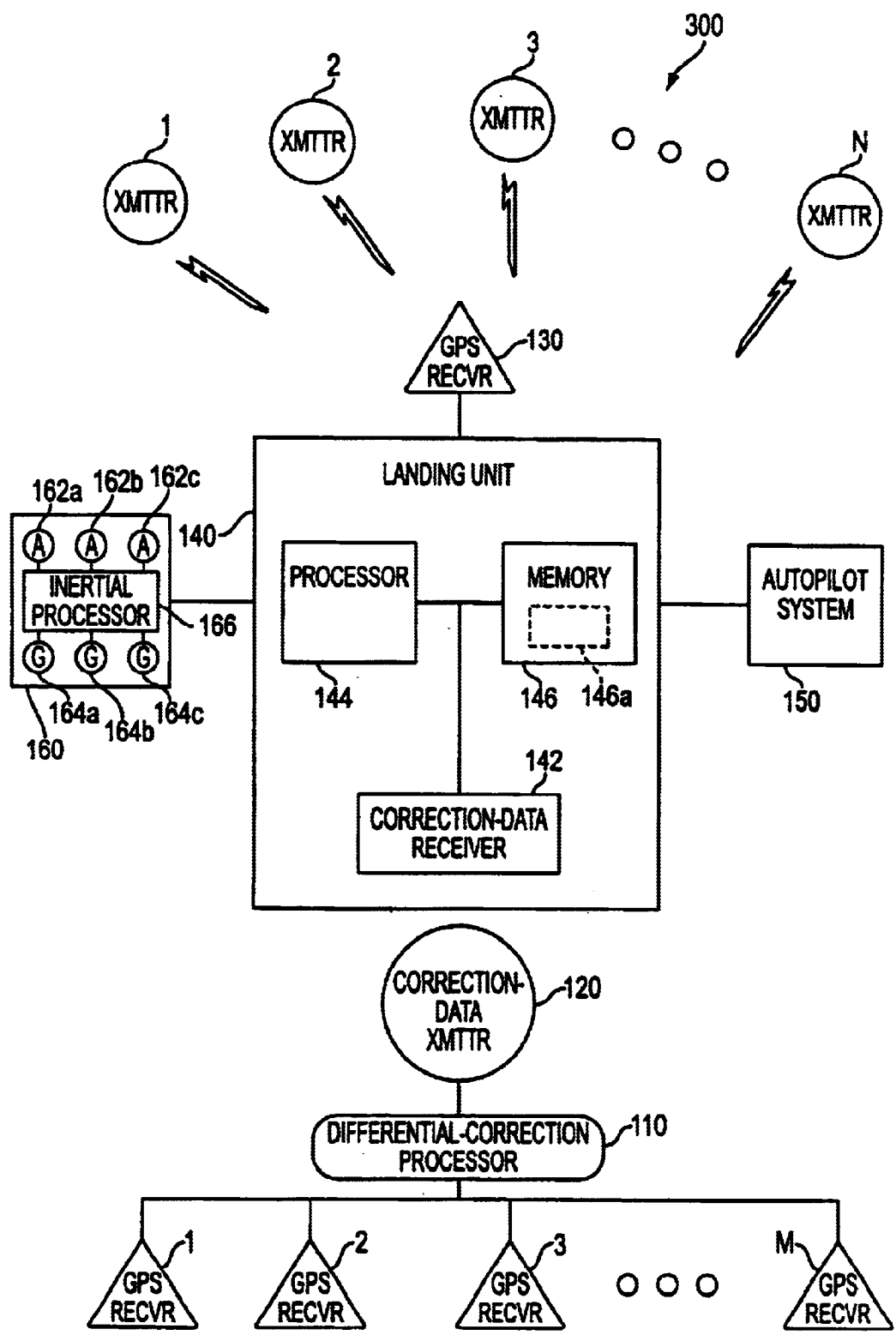
FIG. 3 is a block diagram of a second exemplary navigation and guidance system 300 incorporating the present invention.

FIG. 3 shows a radio navigation system 300 which extends radio navigation system 100 of FIG. 1 with the addition of inertial reference unit 160 for providing inertial data to processor 144. The resulting combination constitutes a hybrid navigation system. In the exemplary embodiment, inertial reference unit 160, mounted to the aircraft (not shown), includes three accelerometers 162a–162c for measuring acceleration in three dimensions and three gyroscopes 164a–164c for measuring angular orientation, or attitude, relative a reference plane. Inertial reference unit 160 also includes inertial processor 166 which determines an inertial position solution $r_i$, as for example a three-element vector in an earth-fixed reference frame.

Inertial processor 166, in the exemplary embodiment, also converts the acceleration data into raw acceleration vector $a_{raw}$ and attitude data into raw angular velocity vector $\omega_{raw}$. The exemplary angular velocity vector defines the rotation of the body frame (fixed to the aircraft) in three dimensions, and the exemplary inertial acceleration defines the three components of acceleration in body frame coordinates. Inertial processor 166 also determines a transformation matrix C for transforming body frame coordinates to local vertical frame L, a three-element rotation vector $\omega_{IE}$ which describes rotation of the earth-based inertial frame I transformed to L frame, and rotation vector $\omega_{EL}$ which describes rotation of the earth-fixed frame E versus inertial frame I transformed to L frame. The details of this inertial processing are well known in the art.

At the heart of the exemplary Kalman filter implementation are the hybrid state vectors $\Delta X_0 - \Delta X_M$, each of which has (20+N) error states. $\Delta X_0$ incorporates all of the differential corrections from the M ground receivers and $\Delta X_m$ excludes the m-th differential correction from the m-th ground receiver. More specifically, the m-th state vector $\Delta X_m$ is defined as $$\Delta X_m^T = [\psi, \Delta v, \Delta r_m, \Delta rtc, \Delta vfc, \Delta\omega_0, \Delta a_0, v_x, v_y, g_z, \Delta e_n] \quad (26)$$

where $\Psi \triangleq$ Three-element attitude error vector;

$\Delta v \triangleq$ Three-element velocity error vector;

$\Delta r \triangleq$ Three-element hybrid position solution excluding m-th differential correction;

$\Delta rtc \triangleq$ One-element receiver clock phase error expressed as a distance (analogous to $c\Delta t$ in first embodiment);

$\Delta vfc \triangleq$ One-element receiver clock frequency error expressed as a velocity;

$\Delta\omega_0 \triangleq$ Three-element vector of gyro biases modeled as first-order Markov processes with 100 hour-time constant;

$\Delta a_0 \triangleq$ Three-element vector of accelerometer biases modeled as first-order Markov processes with 100-hour time constant; and $v_x \triangleq$ gravity deflection in east direction of north-east coordinate plane;

$v_y \triangleq$ gravity deflection in north direction of north-east coordinate plane;

$g_z \triangleq$ gravity anomaly in z direction relative the north-east coordinate plane;

$\Delta e_N \triangleq$ N-element smoothing-error state vector which compensates for correlation of the correction data that results from carrier smoothing.

(For clarity, the "m" subscripts are not shown on each state variable in $\Delta X_m$.) Thus, hybrid state vector $\Delta X_0 - \Delta X_M$ include respective position solutions $\Delta r_0 - \Delta r_M$, where the subscript again defines the excluded differential correction data. Note that $\Delta r$ in the this embodiment includes only three spatial components, whereas in the first embodiment, it included three spatial components and $c\Delta t$, the distance associated with the receiver clock offset. The state vector $\Delta X$ identifies this variable as $\Delta rtc$. The exemplary embodiment orders the (20+N) state variables as shown; however, other greater or lesser numbers of state variables and other variable sequences are equally feasible.

Figure 4:
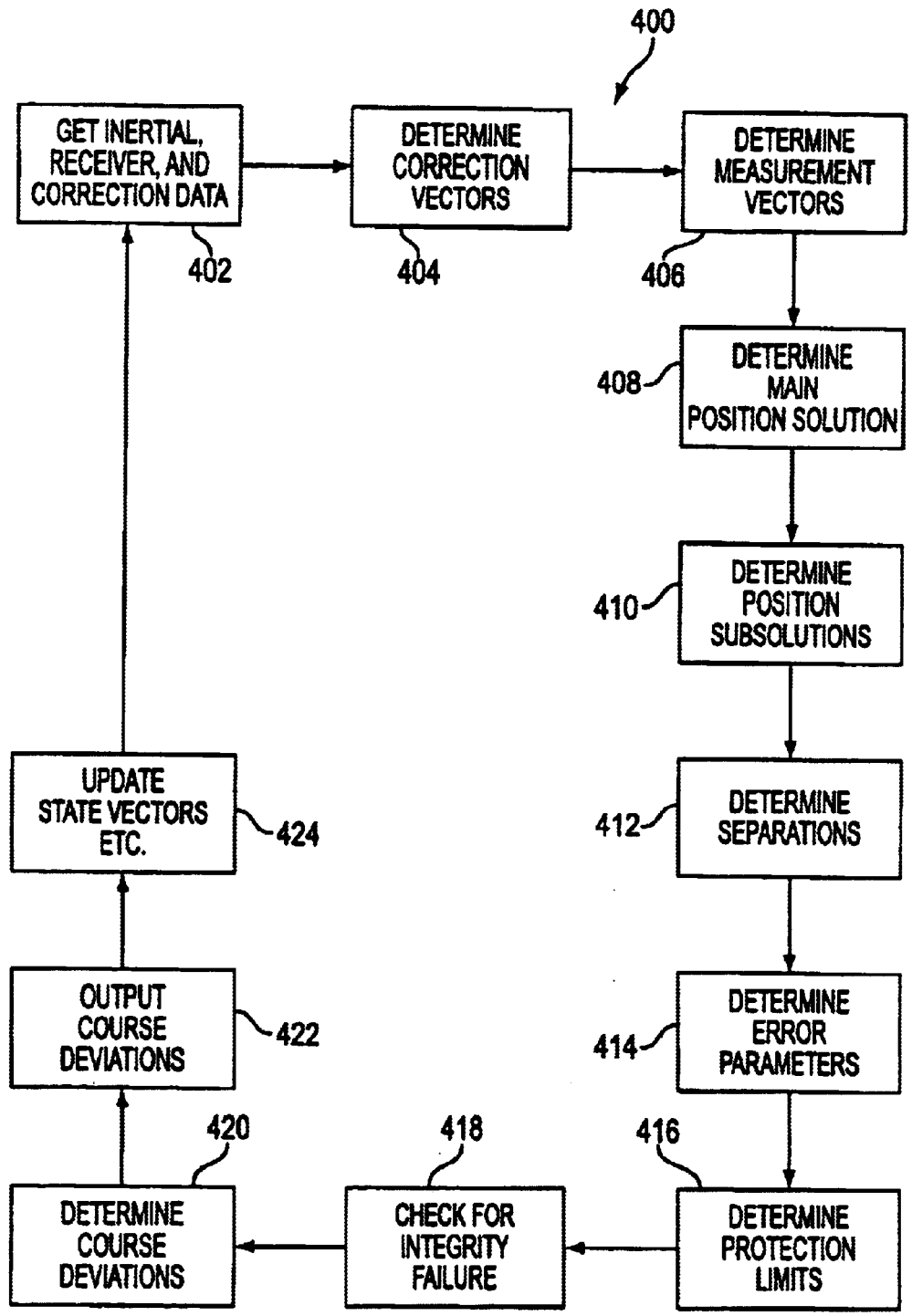
FIG. 4 is a flow chart showing an exemplary method of operating the system of FIG. 3 according to the present invention.

FIG. 4 shows a flow chart 400 which illustrates the important operative aspects of the exemplary hybrid navigation system. The flow chart, similar to that in FIG. 2, includes process blocks 402–424. These blocks can not only be ordered, but are equally applicable to hardware, firmware, and software implementation. In some embodiments, the processor cycles through this process loop every 1–10 seconds.

In particular, the operation begins at block 402 when the processor retrieves inertial, vehicle receiver, and correction data. The exemplary embodiment retrieves the following inertial data from inertial reference unit 160:

inertial position solution $r_I$,
raw acceleration vector $a_{raw}$,
raw angular velocity vector $\omega_{raw}$,
transformation matrix C,
rotation vector $\omega_{IE}$, and
rotation vector $\omega_{EL}$.

Other embodiments use other forms of equivalent raw or processed inertial data, such as estimated or predicted inertial data.

After retrieving this inertial data, the processor models the inertial error dynamics based on motion of the aircraft. This occurs within the context of a linearized inertial error model, which is referenced to local vertical coordinate frame L. This inertial error model defines an attitude error vector $\psi$, a velocity error vector $\Delta v$, and a hybrid position solution $\Delta r$, each stemming from the solution of the following three differential equations:

$$\dot\psi = C\Delta\omega_{IB} + \psi \times (\omega_{IE} + \omega_{EL}) \tag{27}$$

$$\Delta\dot v = \psi \times Ca_{raw} + C\Delta a_{IB} + (2\omega_{IE} + \omega_{EL}) \times \Delta v + G\Delta r + \Delta g \tag{28}$$

$$\Delta\dot r = \Delta v + \omega_{EL} \times \Delta r \tag{29}$$

where $\Delta\omega_0 \triangleq$ Gyro biases modeled as first order Markov processes with a 100 hour time constant;

$\Delta\omega_{IB} \triangleq \Delta\omega_0$+scale factor and misalignment errors;

$\Delta a_0 \triangleq$ Accelerometer biases modeled as first order Markov processes with a 100 hour time constant;

$\Delta a_{IB} \triangleq \Delta a_0$+scale factor and misalignment errors;

$\Delta g \triangleq$ Gravity deflections and anomaly ($v_x g$, $v_y g$, $\Delta g_z$)

G is a 3×3 matrix defined as $$G = \begin{bmatrix} -g(0)/R^{[1]} & 0 & 0 \\ 0 & -g(0)/R^{[1]} & 0 \\ 0 & 0 & 2g(0)/R^{[2]} \end{bmatrix} \tag{30}$$

where R denotes the radius of the earth, and g(0) denotes gravity at zero height. The superscripts [1] and [2] identify the specific terms affecting accuracy. In particular, [1] identifies the two gravity terms responsible for Schuler feedback, and [2] identifies the gravity term responsible for the vertical feedback.

In block 402, the processor also retrieves psuedoranges from vehicle receiver 130 and correction data from receiver 144. After retrieving the psuedoranges and correction data, the processor determines the number of pseudoranges N and the number of differential corrections M, before proceeding to block 404.

In block 404, the processor defines M+1 different N-element correction vectors $\delta\rho^0$–$\delta\rho^M$, based on the full set of N differential corrections for each ground receiver M. The full set of N differential corrections are derived from the M different B values and the average differential correction (from the correction-data tranmitter) for each of the N satellites. $\delta\rho^0$, the main correction vector, is defined as $$\delta\rho^0 = [\delta\rho_1, \delta\rho_2, \ldots, \delta\rho_N]^T \tag{31}$$

where each element $\delta\rho_n$ denotes a uniform or nonuniform weighted average of the differential corrections from all the ground receivers 1–M for the n-th satellite transmitter. $\delta\rho^m$ (for m=1 to M) is defined as $$\delta\rho^m = [\delta\rho_{1,m}, \delta\rho_{2,m}, \ldots, \delta\rho_{N,m}]^T \tag{32}$$

where element $\delta\rho_{n,m}$ is defined as a uniform or non-uniform weighted average of all but the m-th differential correction for the n-th satellite. Thus, as in the first embodiment, each element $\delta\rho_{n,m}$ excludes correction information from the m-th ground receiver.

At block 406, the processor applies the correction vectors $\delta\rho^0$–$\delta\rho^M$ to determine a set of (M+1) N-element corrected measurement (or pseudorange) vectors $\Delta\rho^0_{meas}(k)$–$\Delta\rho^M_{meas}(k)$ linearized around the initial or previous position estimate. This first entails determining (M+1) N-element pseudorange residual vectors $\Delta\rho^0(k)$–$\Delta\rho^M(k)$, with the m-th pseudorange residual $\Delta\rho^m(k)$ defined as $$\Delta\rho^m_{meas}(k) = \rho^m_{meas}(k) - \rho^m_{est}(k) \tag{33}$$

In this equation, $\rho_{meas}$ are the actual pseudorange measurements and $\rho^m_{est}(k)$ are the estimated pseudoranges based on the previous m-th absolute hybrid subsolution $r_m(k)$ and the receiver clock offset $\Delta rtc_m$, with the subscript m denoting exclusion of the m-th pseudorange corrections from the vector. $r_m(k)$, the m-th absolute hybrid subsolution, is defined as $$r_m(k) = r_I(k) + \Delta r_m^E(k) \tag{34}$$

where the superscript E denotes that the relative hybrid position solution $\Delta r_m$ has been transformed from the L frame to the earth-fixed frame for addition to the inertial position solution $r_I$. In short, $\rho^m_{est}(k)$ means an N-vector of pseudoranges which would yield $r_m(k)$ as a position solution. Moreover, since $\rho^m_{est}(k)$ depends on the inertial position solution $r_I$ and the measured pseudoranges $\rho^m_{meas}$, $\Delta\rho^m_{meas}$ (k) includes both inertial and pseudorange information.

Defining the pseudorange residual relative the previous solution establishes a dynamic reference trajectory for the solutions. Kalman filters that rely on this kind of iteratively updated residual are known as extended Kalman filters. After linearizing the vectors around the $\rho^m_{est}(k)$, the processor applies the correction vectors to each of the pseudorange residuals. $\Delta\rho^0_{meas}$, the main corrected measurement vector including correction information from all M ground receivers, is defined as $$\Delta\rho^0_{meas} = \Delta\rho^0_{meas} + \delta\rho^0 \tag{35}$$

and $\Delta\rho^m_{meas}$ is defined as $$\Delta\rho^m_{meas} = \Delta\rho^m_{meas} + \delta\rho^m \tag{36}$$

where N-element correction vectors $\delta\rho^0$ and $\delta\rho^m$ follow the definitions of equations 3, 4, and 5.

Blocks 408 and 410 respectively entail computing the main solution $\Delta r_0(k)$ and subsolution $\Delta r_1(k)$–$\Delta r_M(k)$. In the Kalman implementation, these solutions depend on the Kalman gain vectors. Thus, as part of the computations for these solutions, the processor first determines Kalman gain vectors $g^0_n(k)$–$g^M_n(k)$ (one for each of the N satellites) for updating all the states of corresponding hybrid state vectors $\Delta X_0 - \Delta X_M$. Updating these state vectors also updates corresponding solution $\Delta r_0(k)$ and subsolutions $\Delta r_1(k) - \Delta r_M(k)$. The m-th Kalman gain vector $g^m_n(k)$ is defined as $$g^m_n(k) = \frac{P_m(k)h_n}{h_n^T P_m(k)h_n + r} \quad (37)$$

In this relation, $P_m(k)$ is the error covariance matrix for the m-th receiver, and $h_n$ is a $1\times(20+N)$ measurement matrix, which selects the combinations of error states incorporated in the m-th measurement. $h_n$ is defined as $$h_n^T = [0_3 \ 0_3 - U_n \ 1 \ 0 \ 0_3 \ 0_3 \ 0 \ h_e] \quad (38)$$

where $0_3$ is a three-element zero vector, and $U_n$ is a 3-element line-of-sight, or unit direction, vector pointing from the m-th ground receiver to the n-th satellite. (The components of the line-of-sight vector are called direction cosines, in classical navigation geometry.) $h_e$ is an N-element vector, such as $(0, 0, \ldots, 1, \ldots, 0)$, which selects the associated smoothing error states that are involved in the GPS measurement, with all elements except the n-th one set to zero. The dimensions of h depend on the number of states in the Kalman filter. r is the carrier measurement noise variance and is defined as $$r = \frac{\sigma^2_{cr-rec}}{M} + \sigma^2_{cr-air} \quad (39)$$

for the main filter and $$r = \frac{\sigma^2_{cr-rec}}{M-1} + \sigma^2_{cr-air} \quad (40)$$

for the subfilters.

In the Kalman gain equation, n ranges from 1 to N for each m=1 to M. This "n-loop" portion for determining the Kalman gain shows that this Kalman filter implementation follows a measurement-by-measurement approach, rather than a batch-processing approach. Although the two approaches are mathematically equivalent, the measure-by-measurement approach reduces the number of processor operations required for the Kalman filter calculations.

With the Kalman gain vectors, the processor can now update hybrid state vectors $\Delta X_0 - \Delta X_M$ and thereby determine the position solutions $\Delta r_0(k) - \Delta r_M(k)$, as blocks blocks 408 and 410 indicate. The recursive updates follow:

$$\Delta X_0(k) = \Delta X_0(k) + g_n^0(k)[\Delta \rho_n^0(k) - h_n^T \Delta X_0(k)] \quad (41)$$

$$\Delta X_m(k) = \Delta X_m(k) + g_n^m(k)[\Delta \rho_n^m(k) - h_n^T \Delta X_m(k)] \quad (42)$$

where $\Delta \rho_n^m(k)$ are sequentially updated measurement vectors, with $\Delta \rho_1^m(k) = \Delta \rho^m_{meas}(k)$. The update stems from the change in $r_m(k)$ in each iteration, for n=1 to N.

After updating the hybrid state vectors $\Delta X_0 - \Delta X_M$, which include corresponding solutions $\Delta r_0(k) - \Delta r_M(k)$, the processor determines the lateral and vertical separations, error parameters, and protection limits. As FIG. 4 shows this entails executing blocks 412, 414, and 416.

More particularly, in block 412, the processor computes lateral separations $b_{L1}(k) - b_{LM}(k)$ and vertical separations $b_{V1}(k) - b_{VM}(k)$. The exemplary embodiment defines separations $b_{L1}(k) - b_{LM}(k)$ as $$b_{Lm}(k) = \sqrt{(\Delta r_0(L) - \Delta r_m(L))^2} \quad (43)$$

where (L) denotes lateral components of the position solutions and for convenience the temporal notation for the solution components has been omitted. Similarly, the exemplary embodiment defines the vertical separations $b_{V1}(k) - b_{VM}(k)$ as $$b_{Vm}(k) = \sqrt{(\Delta r_0(V) - \Delta r_m(V))^2} \quad (44)$$

where the (V) denotes the vertical component of the main solution and the m-th subsolution and again the temporal notation has been omitted for convenience. Operation then proceeds to block 414.

In block 414, the processor determines the lateral and vertical error parameters $A_{L1}(k) - A_{LM}(k)$ and $A_{V1}(k) - A_{VM}(k)$ from error covariance matrices $P_1(k) - P_M(k)$. The lateral and vertical parameters are defined as $$A_{Lm}(k) = \sqrt{\text{VAR}_{Lm(k)}} Q^{-1}(P_{MD}) \quad (45)$$

$$A_{Vm}(k) = \sqrt{\text{VAR}_{Vm(k)}} Q^{-1}(P_{MD}) \quad (46)$$

where $\text{VAR}_{Lm}$ and $\text{VAR}_{Vm}$ denote the lateral and vertical variances from the m-th covariance matrix; $P_{MD}$ is a given probability of missed detection; and $Q^{-1}$ denotes the inverse of the well-known normalized cumulative distribution function Q(x). The error covariance matrices $P_1(k) - P_M(k)$, which define the statistics, including the lateral and vertical variances, of the corresponding subsolution errors, follow the recursive relation $$P_m(k) = P_m(k) - g_n^m(k) h_n^T P_m(k) \quad (47)$$

where m ranges from 1 to M.

Then, in block 416, the processor uses the separation and the error parameters to compute the lateral and vertical protection limits LPL(k) and VPL(k) according to $$LPL(k) = \max\{LPL_{H0}(k), LPL_{H1}(k)\} \quad (48)$$

$$VPL(k) = \max\{VPL_{H0}(k), VPL_{H1}(k)\} \quad (49)$$

which, except for the iterative notation, follow the same form and definitions as used in the first embodiment at Eqns. 20–25. However, because of the recursive derivation of the solutions $\Delta r_0 - \Delta r_M$, and more particularly, the error covariance matrices $P_1(k) - P_M(k)$, the protection limits incorporate not only inertial data but also present and past GPS measurement and correction data.

Having determined the lateral and vertical protection limits, processor 144 executes block 418 which entails comparing them to respective predetermined lateral and vertical alarm limits LAL and VAL. If either the lateral protection limit or the vertical protection limits exceeds its alarm limit, the processor signals the aircraft cockpit, alerting the pilot of the integrity failure. Optionally, if the actual lateral or vertical separations between the m-th solution $\Delta r_m$ and the main position solution $\Delta r_0$ exceeds a threshold based on a selected probability of false detection, the processor sets a failure flag indicating a ground-receiver fault.

At block 420, the processor computes angular and/or linear course deviations based on the main position solution and the reference path to autopilot system 150. In response, the autopilot system automatically corrects or adjust the glide path of the aircraft as indicated in block 422.

To complete the k-th iteration, the processor projects, or propagates, forward one iteration as indicated in step 424. This entails determining the next, or $k+1^{th}$, hybrid state vectors $\Delta X_0(k+1)$ through $\Delta X_M(k+1)$ using $$\Delta X_m(k+1) = \Phi(k) \Delta X_m(k) \quad (50)$$

and estimating the $k+1^{th}$ error covariance matrices $P_0(k+1)$ through $P_M(k+1)$ using $$P_m(k+1)=\Phi(k)P_m(k)\Phi(k)^T+Q_{mm}(k) \quad (51)$$

In these relations, $\Phi(k)$ is the state transition matrix relating the k-th hybrid state vector to the next (k+1)-th estimate, according to the inertial dynamics defined by the linearized inertial error model of equations 27–29. And, $Q_{mm}(k)$ is the noise covariance matrix given by $$Q_{mm}(k)=E[v(k)v(k)^T] \quad (52)$$

where $v(k)$ is the process noise vector which defines the noise in the inertial measurements.

In implementations which use carrier smoothing, the differential corrections will be strongly correlated and thus contradict a conventional Kalman filtering assumption that the observations, that is, measurement data such as the differential corrections, be uncorrelated. Thus, to compensate for the correlation that exists in these implementations, the exemplary embodiment extends the 20-state error vector with N additional error states $\Delta e_n$ which estimate the smoothing error, that is, the error resulting from use of carrier smoothing. The smoothing filter is equivalent to a signal block that provides the correct pseudorange with carrier noise only summed with the smoothing error $\Delta e_n$ obtained by filtering white noise through a first order linear filter with a 100 second time constant. One complication is that there are M+1 independent noise contributions, one from each of the M ground receivers and one from the correction-data receiver in the landing unit. Under normal conditions all M noise contributions have been filtered long enough (about 200 seconds) to assure convergence before they are used in the Kalman filters. The process noise $q_e$ added to the smoothing error states should correspond to the received $\sigma_{pr\_grd}$.

The exemplary embodiment derives the process noise $q_e$ as follows:

$$\Delta e(k+1) = e^{-\frac{T}{\tau}}\Delta e(k) + w \quad (53)$$

The variance update is ($q_e = E[w^2]$)

$$p_e(k+1) = e^{-2\frac{T}{\tau}}p_e(k) + q_e \quad (54)$$

In stationary (or slowly changing) conditions $p_e(k+1) \approx p_e(k)$, so that the process noise $q_e$ is given by $$q_e = \left(1 - e^{-2\frac{T}{\tau}}\right)p_e \quad (55)$$

For the main filter, the noise variance is $$P_e = \sigma_{pr\_gnd}^2 + \sigma_{pr\_air}^2 \quad (56)$$

And, for the subfilters, the noise variance is $$p_e = \frac{M}{M-1}\sigma_{pr\_gnd}^2 + \sigma_{pr\_air}^2 \quad (57)$$

When satellites are temporarily lost by the landing unit because of masking during maneuvers or interference, the exemplary embodiment restarts the smoothing filters. Generally, it will take up to 200 seconds before the satellite has converged in a standard LAAS. The filters of the exemplary embodiment will use the inertially propagated information and the other satellite measurements to restore the original accuracy. This mechanism will work regardless of how many satellites are lost. If all satellites are temporarily lost, the restoration is based entirely on inertially propagated information. Moreover, the integrity of guidance signal remains valid throughout this period.

After completing the update indicated at block 424, the process returns to block 402 to repeat the entire process loop shown in FIG. 4.

In sum, the second embodiment provides a simple Kalman-filter extension of the first embodiment, which incorporates not only inertial data but also present and past GPS measurement and correction data into the position solution and protection limit calculations. The past data effectively substitutes for any unavailable pseudorange measurement data that would otherwise prevent calculation of the protection limit, enabling the processor to compute the protection limit without interruption.

Moreover, the correction-data exclusion mechanism in the subfilters ensures that at least one subfilter, that is, subsolution, remains immune to failures or outages of ground receivers. Even if the failure occurs over a long time, the subfilter still provides a true reference for integrity monitoring. And, the incorporation of inertial data into the Kalman filters allows the landing unit to operate or coast through most, if not all, stemming from insufficient satellite or correction data.

Conclusion

In furtherance of the art, the inventor has presented unique ground-augmented radio navigation systems and methods which address reliability and continuity shortcomings of conventional ground-augmented GPS navigation and guidance systems. In particular, one embodiment computes a position solution based on GPS satellites and uses correction data from ground receivers to develop one or more position subsolutions. Separations or differences between the position solution and subsolutions and subsolution error variances are used to determine accuracy or protection limits. Another embodiment follows a similar methodology using Kalman filtering techniques to incorporate past and present inertial data and correction date into the solution and subsolution computations, thereby facilitating continued reliance on the system during loss of satellite or correction data.

Although the present invention has been described with reference to preferred embodiments, workers skilled in the art will recognize that changes may be made in form and detail without departing from the spirit and scope of the invention. In particular, those in the art will recognize that a single processor could perform all the operations for implementing the invention or that multiple processors could share these operations. Moreover, the method itself could be divided over distinct functional unit other than those used for illustration here. Of course, other changes in form and detail are also within the spirit and scope of the invention as defined in the following claims.

What is claimed is:

1. A method of determining accuracy of a position solution provided by a differential positioning system, wherein the system includes a plurality of ground receivers, each ground receiver tracking a plurality of satellite signals from a respective plurality of satellite transmitters, and wherein each ground receiver is located at a known position for deriving a receiver-specific differential correction for each of the plurality of satellite signals, the method comprising:

determining correction data for each of the plurality of satellite signals, wherein the correction data for each of the plurality of satellite signals is based on an average value of the receiver-specific differential corrections derived from all of the plurality of ground receivers;

determining one or more subsets of the correction data for each of the plurality of satellite signals, wherein each of the one or more subsets of the correction data is based on an average value of a respective subset of the receiver-specific differential corrections, the respective subset of the receiver-specific differential corrections derived from a respective subset of the plurality of ground receivers;

forming the position solution using the plurality of satellite signals and the correction data for each of the plurality of satellite signals;

forming one or more position subsolutions using the plurality of satellite signals and the one or more subsets of the correction data, wherein each of the one or more position subsolutions is based on the plurality of satellite signals and a respective subset of the correction data for each of the plurality of satellite signals; and calculating one or more separations as a function of a difference between the position solution and each of the one or more position subsolutions, the one or more separations providing an indication of the accuracy of the position solution.

2. The method of claim 1, wherein the one or more separations are used to determine a protection limit for the position solution.

3. The method of claim 1, wherein the average value of the receiver-specific differential corrections derived from all of the plurality of ground receivers and the average value of the respective subset of the receiver-specific differential corrections derived from the respective subset of the plurality of ground receivers are uniform or non-uniform weighted averages.

4. The method of claim 1, wherein the position solution and each of the one or more position subsolutions are derived from least-squares estimation.

5. The method of claim 1, wherein the respective subset of the plurality of ground receivers is associated with one distinct ground receiver, and wherein the respective subset of the plurality of ground receivers includes all but the one distinct ground receiver.

6. The method of claim 5, wherein the respective subset of the receiver-specific differential corrections derived from the respective subset of the plurality of ground receivers excludes the receiver-specific differential correction derived from the one distinct ground receiver.

7. For use in a differential navigation system providing a position solution for a vehicle, wherein the system includes a plurality of ground receivers, each ground receiver tracking a plurality of satellite signals from a respective plurality of satellite transmitters, and wherein each ground receiver is located at a known position for deriving a receiver-specific differential correction for each of the plurality of satellite signals, a method of determining accuracy of the position solution, the method comprising:

determining correction data for each of the plurality of satellite signals, wherein the correction data for each of the plurality of satellite signals is based on an average value of the receiver-specific differential corrections derived from all of the plurality of ground receivers;

determining a plurality of subsets of the correction data for each of the plurality of satellite signals, wherein each of the plurality of subsets of the correction data is based on an average value of a respective subset of the receiver-specific differential corrections, the respective subset of the receiver-specific differential corrections derived from a respective subset of the plurality of ground receivers, and wherein the respective subset of the plurality of ground receivers includes all but one distinct ground receiver;

forming the position solution using the plurality of satellite signals and the correction data for each of the plurality of satellite signals;

forming a plurality of position subsolutions using the plurality of satellite signals and the plurality of subsets of the correction data, wherein each of the plurality of position subsolutions is based on the plurality of satellite signals and a respective subset of the correction data for each of the plurality of satellite signals;

calculating a plurality of separations, wherein each of the plurality of separations is based on a difference between the position solution and a respective position subsolution; and determining a protection limit of the position solution for the vehicle based on at least one of the plurality of separations.

8. The method of claim 7, wherein the respective subset of the receiver-specific differential corrections derived from the respective subset of the plurality of ground receivers excludes the receiver-specific differential correction derived from the one distinct ground receiver.

9. The method of claim 7, embodied as machine language instructions executed by a processor located aboard the vehicle.

10. The method of claim 7, wherein the protection limit includes lateral and vertical components.

11. The method of claim 7, wherein the vehicle is an aircraft.

12. The method of claim 11, wherein the system is a Local Area Augmentation System (LAAS), and wherein the plurality of subsets of the correction data, each based on the average value of the respective subset of the receiver-specific differential corrections, are determined from a plurality of B values for each of the plurality of satellite signals, and wherein each of the plurality of subsets of the correction data is determined from a respective one of the plurality of B values.

13. The method of claim 12, wherein the respective one of the plurality of B values is associated with the one distinct ground receiver, and wherein the respective subset of the receiver-specific differential corrections excludes the receiver-specific differential correction derived from the one distinct ground receiver.

14. The method of claim 7, wherein the position solution and each of the plurality of position subsolutions are calculated using Kalman filtering.

15. The method of claim 14, wherein the Kalman filtering incorporates inertial sensor data into the calculation of the position solution and each of the plurality of position subsolutions, the inertial sensor data providing a motion data of the vehicle.

16. The method of claim 7, further comprising:

comparing the protection limit to an alarm limit; and signaling an integrity failure if the protection limit exceeds the alarm limit.

* * * * *